United States Patent Office 3,455,873
Patented July 15, 1969

3,455,873
SELF-EXTINGUISHING COMPOSITION COMPRISING POLYSTYRENE AND AN ORGANIC BROMINE COMPOUND
Herbert Jenkner, Cologne-Deutz, Germany, assignor to Chemische Fabrik Kalk G.m.b.H., Cologne-Kalk, Germany
No Drawing. Filed Nov. 22, 1965, Ser. No. 509,188
Claims priority, application Germany, Nov. 20, 1964, C 34,428
Int. Cl. C08f 47/08; C09k 3/28
U.S. Cl. 260—45.7        2 Claims

ABSTRACT OF THE DISCLOSURE

Self-extinguishing shaped bodies of a composition the greater part of which consists of styrene in polymeric form which comprises uniformly incorporating therein an amount of at least one organic bromine compound containing both acyclic aliphatically and cycloaliphatically bonded bromine in the molecule in an amount effective to render said composition self-extingiushing.

---

This invention relates to non-readily inflammable and self-extinguishing shaped parts produced from styrene-containing molding masses.

Shaped parts of polystyrene or of copolymers containing polystyrene have found many uses in the building industry because of their favorable mechanical and physical properties. Primarily, shaped parts made from polystyrene, which is possibly foamed, or from copolymers mainly consisting of styrene are characterized by exceptionally good heat, sound and electrical insulating properties. In view of their inflammability, the use of shaped parts consisting of, or primarily consisting of, polystyrene is severely restricted in the building industry.

However, the inflammability of polystyrene or styrene copolymers can be reduced by a content of organic chlorine compounds, for example, chlorinated paraffins with a chlorine content of over 50% by weight, polyvinylchloride, tetrachloroethane, tetrachlorobutane, tetrachlorobutyrolacetone, hexachlorocyclopentadiene, bis-(pentachlorophenoxy-compounds, which are often applied with synergistically acting substances such as antimony trioxide, antimony sulphite, organic peroxides and like substances. However, these organic chlorine compounds must be present in large quantities in the polystyrene or in the polystyrene containing copolymers so as to produce adequate flameproofing. But such large quantities of additives detrimentally change the mechanical and physical properties of the polystyrenes or the polystyrene containing copolymers.

Organic bromine compounds, for example, 1,1,2,2-tetrabromoethane, tetrabromobutane, 1,2 - dibromoethylbenbenzene tetrabromocyclododecene, a tetrabromo derivative of butanediol-1,4-divinylether, mono-, di- or tribromobenzene or like compounds are also known to reduce the inflammability of polystyrene or styrene containing copolymers. Compared with the organic chlorine compounds, organic bromine compounds have the advantage that considerably less quantities need to be present in the polystyrene or styrene containing copolymers in order to effect the same flameproofing as the organic chlorine compounds. In view of the smaller addition of organic bromine compounds, the mechanical and physical properties of the polystyrene or polystyrene containing copolymers undergo a corresponding smaller detrimental change than do the properties of a polystyrene or styrene containing copolymer having the same degree of flameproofness but effected by organic chlorine compounds.

The aforementioned organic bromine compounds which contain the bromine bonded to an aliphatic hydrocarbon radical are easily exuded and split off the bromine or hydrobromic acid already at comparatively low temperatures. If a polystyrene or styrene containing copolymer made flameproof with these bromine compounds is subjected to heat which is insufficient to cause it to ignite for a prolonged period or to prolonged fire, the flameproofing component volatilizes or a large proportion of the bromine is split off and driven out of the polymer in the form of free bromine or hydrobromic acid. The inflammability of the polymer will therefore accordingly increase. In the cycloaliphatic and above all in the aromatic compounds, the bromine is bound considerably more tightly and is released only at very high flame temperatures so that these bromine compounds do not give adequate flameproofing against smoldering fires or fires having a low flame temperature.

Endeavors have therefore been made to discover ways of making polystyrene or styrene containing copolymers flameproof against fires having high or low flame temperatures, without detrimentally influencing the mechanical and physical properties of the styrene or the polystyrene containing copolymers.

According to the invention, non-readily inflammable and self-extinguishing shaped bodies are provided which can be produced by shaping and hardening, at elevated temperatures, molding masses which primarily or almost completely consist of monomeric or polymeric styrene, wherein the molding masses have added thereto at least one organic bromine compound containing both acyclic aliphatically and cycloaliphatically bonded bromine in the molecule.

Of the organic bromine compounds to be used in accordance with the invention and containing both acyclic aliphatic and cycloaliphatic bonded bromine in the molecule, dibromoethyl derivatives and dibromopropyl derivatives of dibromocyclopentane, dibromocyclohexane, dibromocyclodecane and dibromocyclododecane have been found to be particularly suitable. However, since the principle of the effect of these compounds is obviously based on the fact that they contain both acylic aliphatically and cycloaliphatically bonded bromine in the molecule, other organic bromine compounds which fulfill this requirement can also be used for carrying out the process of the invention. To simplify the description, these compounds will hereinafter be referred to as "the bromine compounds."

The principal component of the molding masses to be used in accordance with the invention should be styrene in monomeric or polymeric form. Thus, for carrying out the preparation of the shaped bodies according to the invention molding masses can be used which almost completely consist of monomeric styrene. However, instead of the monomeric styrene, mixtures can be used which, apart from styrene, contain other compounds which are copolymerizable with styrene, for example, butadienes, halogenated vinyl compounds, unsaturated polyesters, esters or nitriles of acrylic or methacrylic acid, vinylcarbazole, divinylbenzene or compounds of like structure. What is important for such compounds is that they comprise at least one polymerizable olefinic double bond in the molecule.

The monomeric styrene or the mixtures of styrene and the copolymerizable compounds are then mixed with "the bromine compounds." To the mixtures obtained in this manner, other useful additives may be added, for example, softeners, UV stabilizers, fillers and coloring matter. Other flame-resistant substances such as organic phosphorous compounds as well as substances, such as antimony trioxide, which increase the flame resistance of organic halogen compounds can be added to the polymerization mixtures. Molding masses are thereby obtained which, after the addition of small quantities of polymerization catalysts such as benzoyl peroxide, dicumyl peroxide, dicyclohexyl peroxide, azo-bis-isobutyronitrile, can be polymerized at temperatures of 40 to 100° C. with shaping in known manner and then hardened.

But it is also possible to spray granulated polystyrene or granulated styrene copolymers evenly with a solution or suspension of "the bromine compounds." For this purpose "the bromine compounds" can be dissolved or suspended in monomeric styrene or in suitable organic solvents such as petroleum ether, methylene chloride, benzene, diethylether and the like, which are readily volatile. After spraying the solution or suspension of "the bromine compounds" onto a granulate consisting of styrene or a copolymer primarily containing polystyrene, any volatile solvent that may be present must be evaporated whilst the granulate treated with the solution of "the bromine compounds" in monomeric styrene can be immediately processed further. Evaporation of any volatile solvent that may be present can be hastened by slight heating of the granulate in question. However, care should be taken to see that the temperature of the granulate remains below its softening temperature. In spraying on a solution of "the bromine compounds," it is particularly advantageous to convert so-called inflatable polystyrene or styrene containing copolymer granulate to form a molding mass from which foamed shaped parts can be made which are not readily inflammable and are self-extinguishing. The inflatable polystyrene or styrene containing copolymer granulates are known to contain propellants which, upon heating to temperatures above the softening temperature of the respective granulates, vaporize or decompose to form an inert gas. Such propellants may be pentane or they may be nitrogenous compounds which are decomposable to form nitrogen.

After vaporization of the solvents with which "the bromine compounds" have been applied, the inflatable molding masses are in known manner heated to temperatures above their softening temperature, at which temperatures they are shaped to form the foamed molded parts.

"The bromine compounds" should be added to the monomeric styrene containing molding masses as well as to the polystyrene containing molding masses in such quantities that the shaped parts made from these molding masses contain 0.5 to 3.0% by weight and preferably 1 to 2% by weight of bromine.

The shaped parts obtained in the above-described manner and which almost completely consist of polystyrene or for the most part contain polystyrene are, despite their small bromine content, difficult to burn and are self-extinguishing after ignition. "The bromine compounds" that are present in the shaped parts show no migration tendency whatsoever. Their flame-resistance is evident with smoldering fires, i.e., fires of low flame temperature, as well as with fires having a high flame temperature. Since the amount of "the bromine compounds" required to be added in accordance with the invention is small, it has practically no influence on the mechanical and physical properties of the shaped parts.

The flame-resistance of shaped parts made according to the invention is shown by the following results of comparative tests. The tests were carried out with foamed parts because, as a result of their large surface area, they are normally more readily ignitable and burn more quickly than compact parts.

All the examples make use of 100 parts by weight of an inflatable polystyrene granulate containing light ligroin as a propellant and possibly the quantities and types of catalyst given in the table. With thorough stirring, this granulate is sprayed with the organic halogen compounds mentioned in the table dissolved in petroleum ether. After vaporization of the petroleum ether, a calculated amount of the granulate is placed in a mold and is foamed by heating for 1 hour to a temperature of 100° C. to form a shaped part.

The combustion conditions were tested in accordance with the ASTM test specification No. 1692. According to this, samples are sawn from the material to be tested to have a length of 15.24 cm., a width of 5.08 cm. and a thickness of 1.27 cm. A gauze which is 21.59 cm. long and 7.62 cm. wide, made from steel wire of 0.8 mm. diameter, is used as a mounting for these test rods during the test. Such wire gauze had a length of 1.27 cm. and was bent upwardly at an angle of 90° at one of its narrow sides. This wire gauze is held by a clamp at one corner of the upwardly flanged narrow side and by another clamp at the center of the outer narrow side. The sample is laid on the wire gauze so that its narrow side abuts the flanged portion of the wire gauze and so that it lies in the center of the wire gauze. A Bunsen burner having a 3.4 cm. wide slotted nozzle is placed beneath the flanged narrow side of the wire gauze. The wire gauze and the upper edge of the nozzle of the burner should be at a spacing of 1.27 cm. The burner is arranged to burn with a non-luminous gas flame of 3.8 cm. in height. Under these conditions the sample lying on the wire gauze is subjected to the flame for 30 seconds and a measurement is made of the time taken for the sample to extinguish itself after the flame is removed.

COMPARATIVE PRODUCTS

| Test | Organic bromine compound Name | Percent by wt. | Catalyst Name | Percent by wt. | Bromine content of shaped part, percent by wt. | Density of shaped part, kg./m.³ | Extinguishing period sec. |
|---|---|---|---|---|---|---|---|
| 1 | Monochlorotetrabromodiphenyl | 2.85 | Dicumylperoxide | 0.96 | 1.52 | 0.15 | (¹) |
| 2 | Tetrabromoethane | 1.65 | | | 1.52 | 0.15 | 32 |
| 3 | do | 1.65 | | | 1.52 | 0.06 | (¹) |
| 4 | 1-chloro-2,3-dibromopropane | 2.25 | Dicumylperoxide | 0.96 | 1.52 | 0.06 | 9 |
| 5 | do | 2.25 | | | 1.52 | 0.06 | (¹) |

PRODUCTS ACCORDING TO THE INVENTION

| Test | Organic bromine compound Name | Percent by wt. | Catalyst Name | Percent by wt. | Bromine content of shaped part, percent by wt. | Density of shaped part, kg./m.³ | Extinguishing period sec. |
|---|---|---|---|---|---|---|---|
| 1 | Dibromoethyldibromocyclohexane (Tetrabromovinylcyclohexane) | 2.00 | Dicumylperoxide | 0.96 | 1.52 | 0.06 | 0 |
| 2 | Dibromoethyldibromocyclohexane | 2.00 | | | 1.52 | 0.06 | 0 |

¹ Continues to burn.

I claim:
1. A self-extinguishing shaped body of a composition the greater part of which consists of styrene in polymeric form having uniformly incorporated therein at least one organic bromine compound selected from the group consisting of dibromoethyl derivatives and dibromopropyl derivatives of dibromocyclopentene, dibromocyclohexane, dibromocyclodecane and dibromocyclododecane, in an amount such that the shaped body contains from 0.5% to 3% by weight of bromine.

2. A self-extinguishing shaped body according to claim 1 in which said organic bromine compound is dibromoethyldibromocyclohexane.

References Cited

UNITED STATES PATENTS

| | | | |
|---|---|---|---|
| 2,929,851 | 3/1960 | Luvisi | 260—648 |
| 3,025,329 | 3/1962 | Gleason | 260—648 |
| 3,058,926 | 10/1962 | Eichhorn. | |
| 3,188,295 | 6/1965 | Ballast et al. | |
| 3,274,266 | 9/1966 | Mönkemeyer et al. | 260—45.7 |

MURRAY TILLMAN, Primary Examiner

MORTON FOELAK, Assistant Examiner

U.S. Cl. X.R.

260—2.5, 648